June 5, 1928.
J. M. HOWE
1,672,530
BEARING MECHANISM
Filed Sept. 6, 1924
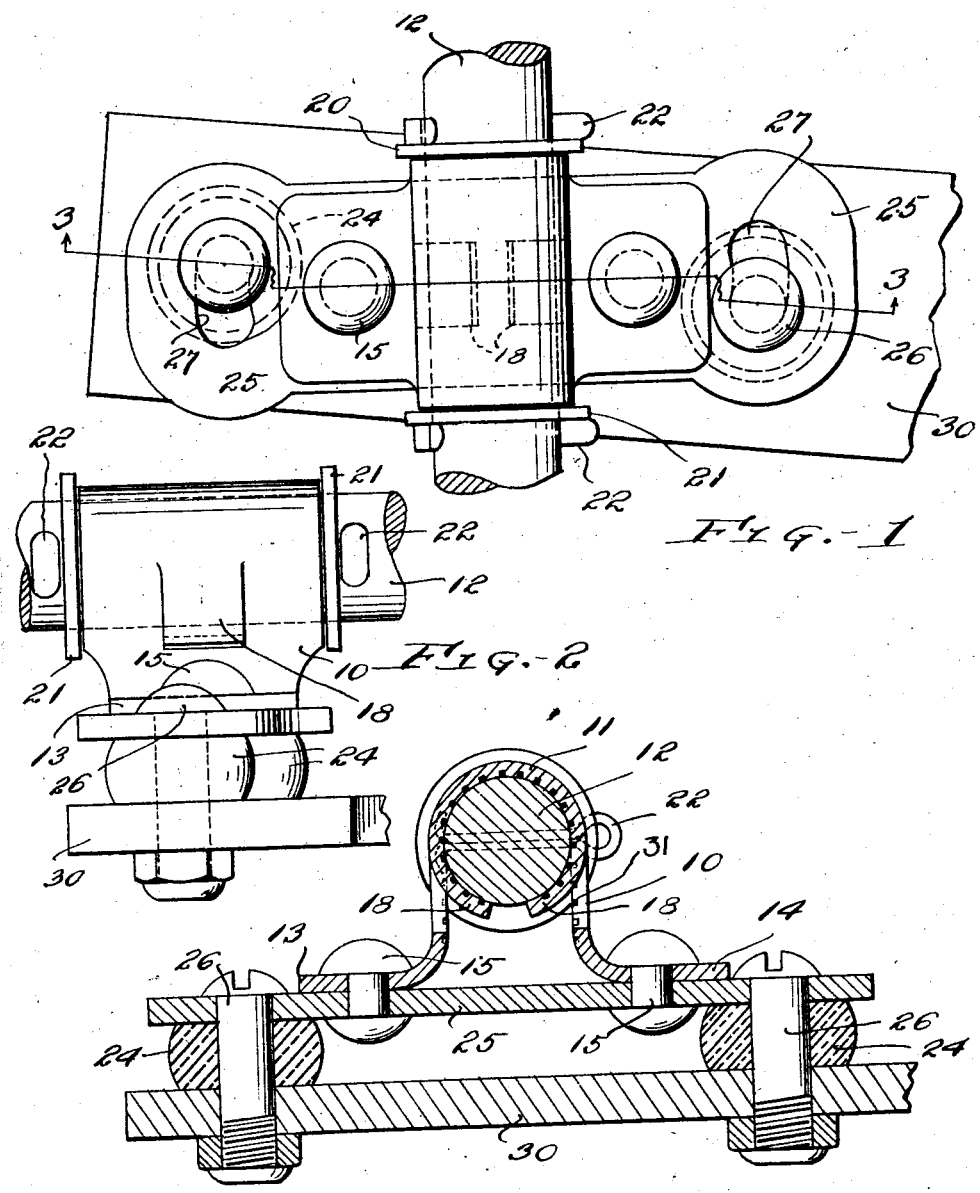

Patented June 5, 1928.

1,672,530

UNITED STATES PATENT OFFICE.

JAMES M. HOWE, OF CLEVELAND HEIGHTS, OHIO, ASSIGNOR TO THE MURRAY MANUFACTURING COMPANY, OF CLEVELAND, OHIO, A CORPORATION OF MICHIGAN.

BEARING MECHANISM.

Application filed September 6, 1924. Serial No. 736,222.

This invention is directed to the provision of an anti-friction bearing adapted to support a rotatable member such as a shaft or an axle.

The general object of my invention is the provision of economical bearing construction constituting both a bearing journal and a bearing bracket.

A further object of my invention is the provision of a resilient base or support for a one piece bearing journal and bracket whereby the bearing construction may be adaptable for use in supporting the driving axle of a vehicle, particularly when the axle bearings are mounted directly upon the leaf springs of the vehicle.

Other objects of my invention will hereinafter be set forth in the following description referring to the accompanying drawings illustrating a preferred form thereof. The essential characteristics are summarized in the claims.

In the drawings, Fig. 1 is a plan view of my bearing construction when adapted for use on a toy vehicle, the bearing mechanism being shown as mounted directly upon the leaf spring of the vehicle; Fig. 2 is a side elevation of the bearing construction shown in Fig. 1 and Fig. 3 is a cross-sectional elevation taken through the bearing construction substantially along the line 3—3 of Fig. 1.

In the form of my invention illustrated in the drawings, the bearing construction may comprise a pressed metal member constituting both a journal box and a bracket, this member preferably being formed of an anti-friction metal such as bronze having the bearing surface thereof intersticed whereby the interstices may be filled with an anti-friction material such as graphite.

Such a member may take the form set forth in Fig. 3 wherein I show a U-shaped pressed metal member 10 of a width corresponding to the desired length of the journal sleeve. This member may have the bent portion 11 thereof of a curvature corresponding to the curvature of the arc of a radius substantially equal to one-half the diameter of the rotatable or shaft member 12 to be supported, the legs of the U-shaped member being spaced apart, of course, a distance corresponding to the diameter of the shaft member.

The legs may be bent outwardly to provide base portions 13 and 14 which may be perforated to receive bolts or rivet members 15 adapted to secure the bearing member to a supporting medium. To substantially complete the circumferential bearing surface, the journal portions 18 are sheared from the legs of the bearing member and bent inwardly. As shown in Fig. 3, these portions are preferably bent or curled to conform to the curvature of the portion 11 of the bracket whereby a substantially complete circumferential bearing surface is provided for the rotatable member 12.

Mounted upon the rotatable member may be thrust members 20 and 21, juxtaposed to the ends of the journal portion of the bearing. They may be maintained in such position in any suitable manner preferably by pin members 22 which may extend through suitable openings formed in the rotatable member 12.

To afford a self-aligning feature for the bearing, I may provide a resilient means in the form of cushion plugs or discs 24 and a separate base member or plate 25 for the bearing member and to which the first portions 13 and 14 thereof may be secured by the rivets 16. The member 26 extends through a suitable opening 27 formed in the plate member 25 formed adjacent the ends thereof. These bolt members may serve to secure the bearing bracket to a vehicle spring 30. The openings 27 formed in the plate member are preferably elongated whereby the spring members may extend at an angle other than a normal or right angle to the center of the rotatable member 12 to suit various styles of spring mounting.

It will be seen that when either end of the rotatable member of shaft 12 is deflected by reason of the vehicle spring at that end being deflected, the bearing members readily follow the deflecting movement of the shaft without any undue binding of the journal portions of the bearing members upon the shaft, the resilient or cushion members 24 permitting the base plate to be turned slightly out of a normally vertical plane. In the event the bearing is used on a vehicle in the manner described, the vehicle spring member 30 of course would be of such design as to permit a slight twisting movement thereof between the bearings and the point where the springs are secured.

If desired, the bearing surface of the member 10 may have grooves or slots 31 formed therein before the member is formed by stamping operations and these slots may be filled with an antifriction or lubricating material such as graphite. I find that such material is readily retained during the stamping of the metal and therefore may be placed in the grooves before the metal is pressed to the form illustrated.

From the foregoing description of my invention, it will be seen that the bearing journal and bracket is adaptable for use in other than on the axle of a spring-mounted vehicle, in which case the legs of the bearing member may be secured directly to an immovable supporting medium. Furthermore, the construction is such that bearings may be made in production in a very economical manner, by stamping and pressing of bearing metal as is readily adaptable to a variety of bearing uses.

Having thus described my invention, I claim:

1. A shaft bearing comprising a single sheet metal member formed at its ends to provide an attachment to a base, its intermediate portion being looped and arcuate to provide upper bearing surfaces for the shaft, said member having inwardly bent partially severed portions continuing the arc of the loop and extending toward each other to provide lower bearing surfaces for the shaft.

2. An axle bearing of the character described, comprising an U-shaped member having the legs thereof flanged and spaced apart a distance substantially equal to the diameter of a rotatable member to be borne, the U-shaped member being of the desired bearing width with portions of the legs being partially severed and bent inwardly to engage a cylindrical surface of the rotatable member, a plate member secured to the flanged portion of the bearing member, a supporting member and resilient means disposed between the plate member and the supporting member.

3. An axle bearing of the character described, comprising a bent member having leg portions spaced apart a distance substantially equal to the diameter of the rotatable member to be borne, and portions of the legs separated from the body of the member along three sides and bent inwardly to engage a cylindrical surface of a member to be borne.

4. In a bearing mechanism a U-shaped journal member formed of flat metal, the legs of the bearing member having partially severed and curled in portions adapted to engage a member to be borne.

5. A shaft bearing construction comprising a U-shaped sheet metal member, having inwardly bent partially severed portions opposite the bottom of the U arranged to engage the shaft and hold it in the bottom of the U, the surfaces of the member engaging the shaft being grooved to receive anti-friction material.

In testimony whereof, I hereunto affix my signature.

JAMES M. HOWE.